United States Patent
Beyer et al.

(10) Patent No.: US 6,828,702 B2
(45) Date of Patent: Dec. 7, 2004

(54) BRUSHLESS DC DRIVE

(75) Inventors: Stefan Beyer, Buehl (DE); Harald Witzig, Cheongwon-Gun (KR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/333,181

(22) PCT Filed: Mar. 16, 2002

(86) PCT No.: PCT/DE02/00968
§ 371 (c)(1),
(2), (4) Date: Jan. 16, 2003

(87) PCT Pub. No.: WO02/095903
PCT Pub. Date: Nov. 28, 2002

(65) Prior Publication Data
US 2003/0173850 A1 Sep. 18, 2003

(30) Foreign Application Priority Data
May 18, 2001  (DE) .......................... 101 24 436

(51) Int. Cl.⁷ .................. H02K 11/00; H02K 21/20; G05B 7/00; H02P 9/04
(52) U.S. Cl. ............. 310/68 C; 310/165; 310/184; 310/156.01; 310/74; 310/77; 310/232; 318/599; 318/801; 290/35
(58) Field of Search .................. 310/165, 184, 310/181, 68 C, 156.74–77, 232; 318/599, 801; 290/38; 300/10

(56) References Cited

U.S. PATENT DOCUMENTS

| | | | | |
|---|---|---|---|---|
| 5,068,590 A | * | 11/1991 | Glennon | 322/10 |
| 5,502,368 A | * | 3/1996 | Syverson | 322/28 |
| 5,929,541 A | | 7/1999 | Naito | 310/12 |
| 6,515,443 B2 | * | 2/2003 | Kelly | 318/599 |

FOREIGN PATENT DOCUMENTS

| | | | | |
|---|---|---|---|---|
| DE | 84 19 864 U | | 11/1986 | .......... H02K/21/04 |
| DE | 37 09 168 A1 | | 9/1988 | ............ H02P/7/63 |
| EP | 0 729 217 B1 | | 1/2000 | ............ H02P/6/00 |
| JP | 05-236714 | * | 9/1993 | ............ H02K/2/04 |

OTHER PUBLICATIONS

Translation of the 05-236714 ( camputer translation ).*
* cited by examiner

Primary Examiner—Dang Le
Assistant Examiner—Iraj A. Mohandesi
(74) Attorney, Agent, or Firm—Michael J. Striker

(57) ABSTRACT

In a brushless direct-current drive with a synchronous motor (10), which has a stator (12) that supports a multi-phase stator winding (15) and a rotor (13) equipped with permanent magnet poles (20), and with a switch unit (11), which precedes the stator winding (15), for commutating the stator winding (15), in order to produce a fail-silent behavior, a field excitation winding (21) is disposed in the rotor (13), which winding can be supplied with current in the event of a malfunction so that it generates a magnetic flux oriented in the opposite direction from the magnetic flux of the permanent magnet poles (20).

13 Claims, 2 Drawing Sheets

BRUSHLESS DC DRIVE

BACKGROUND OF THE INVENTION

The invention is based on a brushless direct-current drive with a synchronous motor and having a stator supporting a multi-phase stator winding and a rotor with permanent magnet poles for generating a magnetic flux that penetrate the stator winding.

In motor vehicles, permanent magnet-excited, brushless direct-current drives are used for a variety of purposes, including for electric steering boosters. These direct-current drives have a synchronous motor with a stator or armature winding and a permanent magnet-excited rotor. The armature winding is connected to the DC voltage network by means of an inverter in a bridge circuit with semiconductor power switches. The inverter that executes the commutation of the stator winding is triggered by an electronic control unit.

DE 37 09 168 A1 describes a synchronous motor operated in a DC voltage network in which three semiconductor power switches triggered by a control unit are disposed in the winding strands of the stator winding, which is wired in a star pattern. If malfunctions occur in the stator winding and/or in the power switches, then the direct-current drive can generate a strong electromagnetic braking moment without the application of a DC voltage since the synchronous motor then functions as a generator in opposition to a low-ohm load resistance. In many applications, such a braking moment impairs the function of the unit or system in which the direct-current drive is being used. Thus for example in electric steering boosters, the braking moment occurring in the event of a malfunction exerts considerable steering forces, which the driver must resist with his own physical strength in order to take the necessary countermeasures. There is thus the danger that the driver will no longer be able to steer the vehicle as desired and will lose control of the vehicle. It is known to provide these direct-current drives with devices, which in the event of such a malfunction, produce a so-called fail-silent behavior of the direct-current drive, i.e. the malfunctioning direct-current drive has no disruptive or disadvantageous influence on the unit or the system and the system therefore functions as if the direct-current drive were not present.

In a known electric steering booster, the desired fail-silent behavior is produced by means of a mechanical clutch via which the driven shaft of the synchronous motor engages the steering booster. In the event of a malfunction, the clutch disengages and consequently mechanically disconnects the motor from the steering system.

A hybrid-excited electrical machine is known (EP 0 729 217 B1), in which the magnetic field of the rotor is generated both by means of permanent magnets and by means of a field excitation winding, which is supplied with excitation current via rotor slip rings. The rotor is axially divided into two rotor halves, which are mounted spaced axially apart from each other on the rotor shaft. Receiving openings are provided in the lamination bundle of each rotor half and the permanent magnets are inserted into them. In terms of their polarity, the permanent magnets are disposed in the rotor halves so that in the one rotor half, they point toward the air gap of the machine with their north pole and in the other rotor half, they point toward the air gap of the machine with their south pole. The permanent magnets in the two rotor halves are offset in relation to one another by a pole division. The field excitation winding embodied in the form of an annular coil is inserted into the intermediary space between the two rotor halves. If the field excitation winding is supplied with DC voltage, then a magnetic flux is generated, which intensifies or weakens the magnetic flux of the permanent magnets depending on the flow direction of the excitation current. This yields a large regulating range for the speed and the voltage of the machine.

SUMMARY OF THE INVENTION

The brushless direct-current drive according to the invention, has the advantage that the desired fail-silent behavior of the direct-current drive is achieved through simple control actions in the direct-current drive itself, without costly external components of the kind represented by mechanical clutches. Through appropriate triggering of the field excitation winding, in the event of a malfunction, the magnetic field of the permanent magnets can be weakened or strengthened by means of the magnetic field of the field excitation winding so that no induced voltage or only a reduced one occurs in the synchronous motor and consequently, no short circuit current or only a reduced one can flow, which generates no braking moment or only a very slight one. In this connection, a moderate temperature-induced decrease in the magnetic field leads to a decrease in the braking moment and prevents an irreversible demagnetization of the permanent magnets and therefore prevents them from being permanently damaged. If a reduction in the braking moment is insufficient, then the magnetic field as a whole can be reduced to zero, but permanent damage to the permanent magnets must then be accepted.

If the field excitation winding of the rotor is supplied with current not only in the event of a malfunction, but also during normal operation, then on the one hand, an addition of the magnetic fields in the motor achieves a high power density and on the other hand in speed-variable operation, higher speeds can be achieved through a deliberately executed field weakening.

According to a preferred embodiment of the invention, the field excitation winding has a number of coils that corresponds to the number of permanent magnets and each coil is wound around one of the permanent magnets. The coils are connected in parallel or in series and are connected to a pair of rotor slip rings that are connected to the rotor shaft in a non-rotating fashion. This structural integration of the field excitation winding into the synchronous motor requires only a slight additional structural and production-related expense in order to produce the desired fail-silent behavior.

BRIEF DESCRIPTION OF THE DRAWINGS

The invention will be explained in detail in the following description, in conjunction with an exemplary embodiment shown in the drawings.

DETAILED DESCRIPTION OF THE PREFERRED EMBODIMENTS

Figure 1:
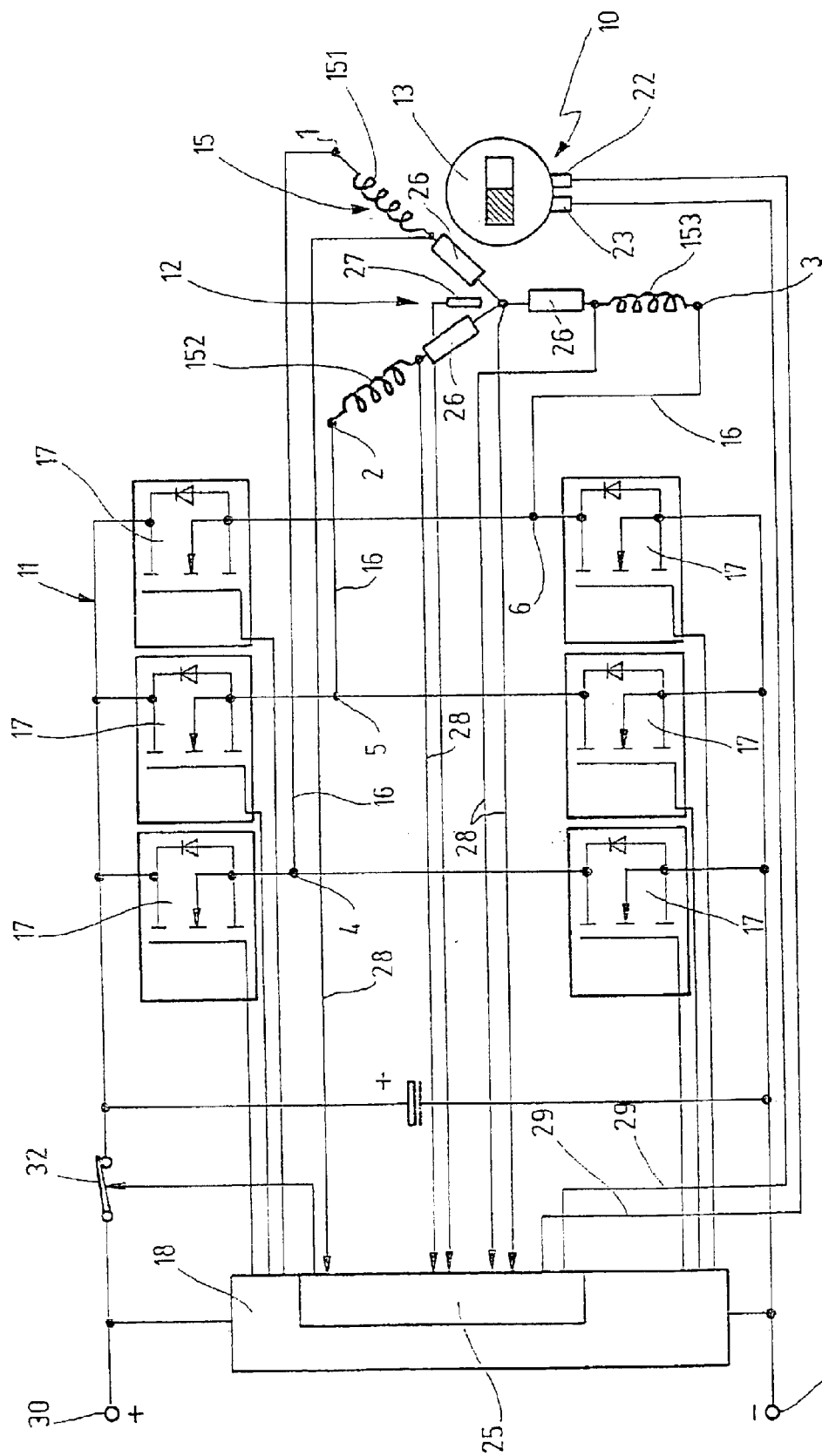
FIG. 1 shows a circuit diagram of a brushless direct-current drive.

The brushless direct-current drive shown in the circuit diagram in FIG. 1 has a synchronous motor 10, which is operated by means of a switch unit 11 for electronic commutation in a DC voltage network, which is characterized in FIG. 1 with "+" and "−" and is connected to connecting terminals 30, 31 of the direct-current drive.

In a known fashion, the synchronous motor 10 has a stator 12 and a rotor 13, which is supported on a rotor shaft 14 (FIG. 2), which is in turn supported in rotary fashion in a housing. The stator 12 supports an armature or stator winding 15, which is embodied as three-phase in the exemplary embodiment and whose winding phases 151–153 are wired in a star pattern. The winding connections 1, 2, and 3 of the stator winding 15 are each connected to the switch unit 11 via a connecting line 16.

The switch unit 11, which is embodied as a B6 inverter, has six semiconductor power switches 17 in a bridge circuit, which in the exemplary embodiment are embodied as MOSFETs. The connecting lines 16 leading to the winding connections 1, 2, and 3 are each connected to one of the taps 4, 5, and 6 of bridge branches, which are each comprised of two power switches 17 connected in series, and are disposed in the connection between each pair of power switches 17. In order to commutate the stator winding 15, i.e. in order to connect the winding phases 151–153 to the DC voltage network at the correct times in coordination with the rotation position of the rotor 13, the power switches 17 can be triggered by an electronic control unit 18.

Figure 2:
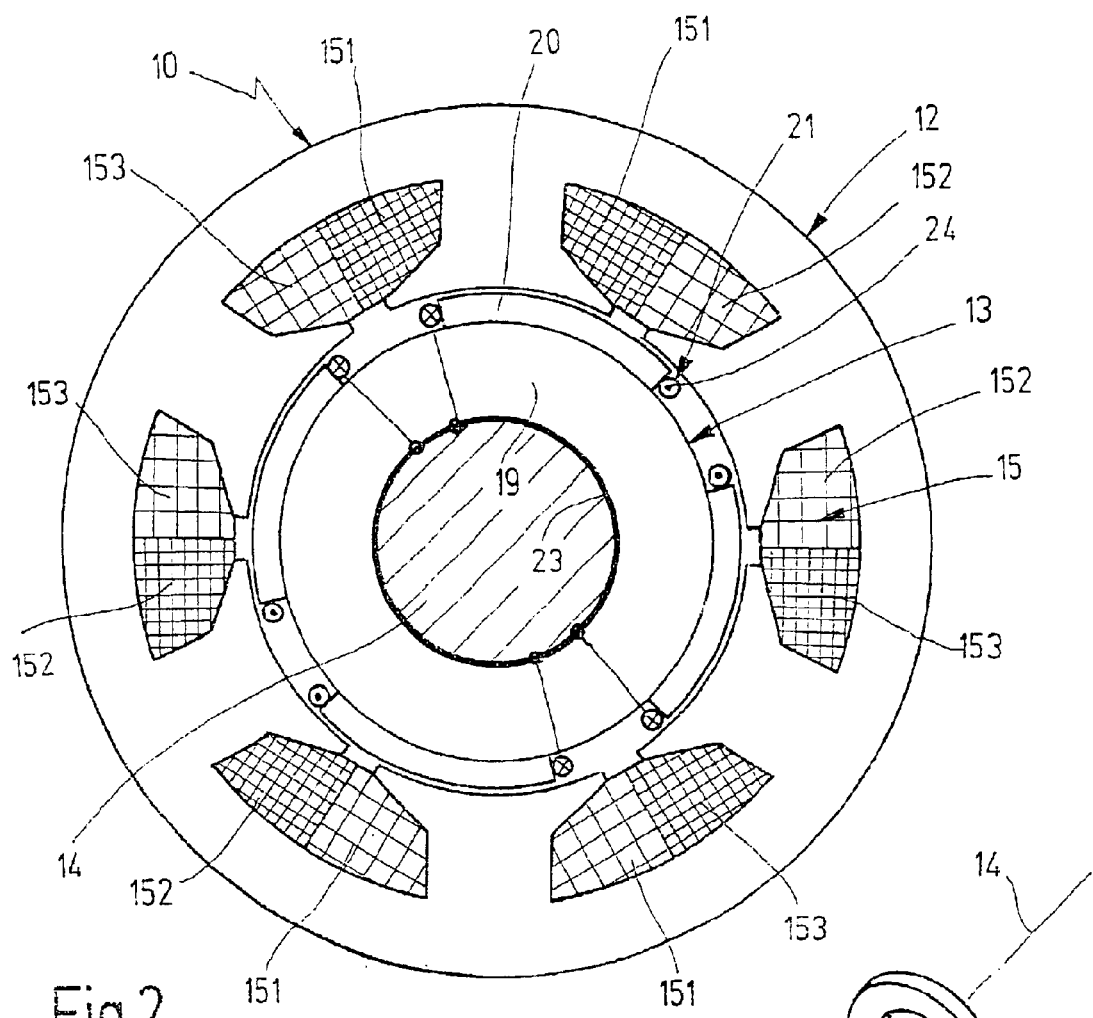
FIG. 2 is a schematic cross section through a three-phase, four-poled synchronous motor in the direct-current drive according to FIG. 1.
Figure 3:
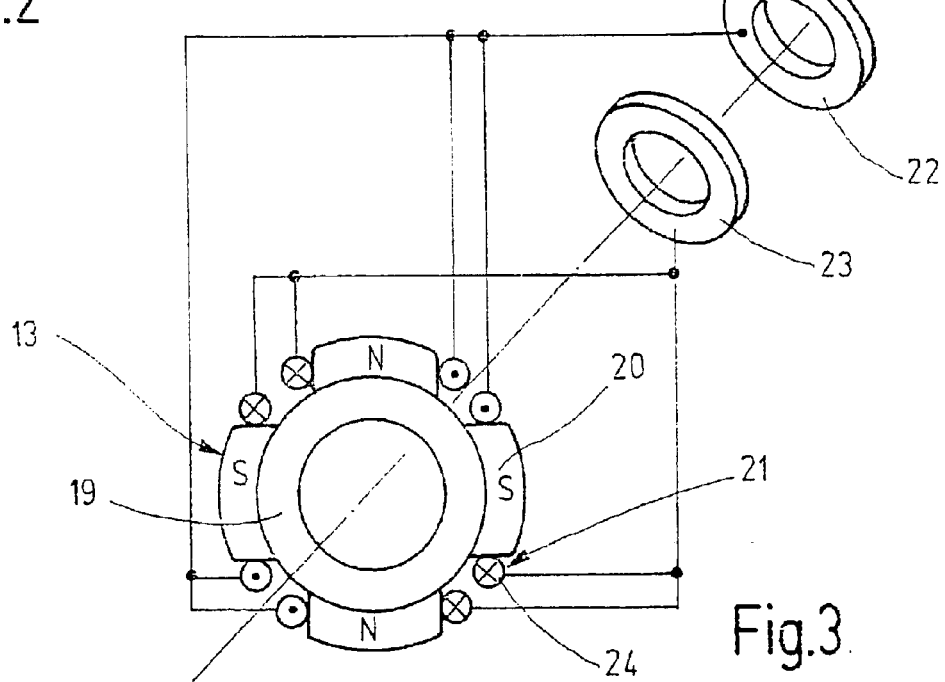
FIG. 3 is a schematic view of the rotor of the synchronous motor in FIG. 2.

The rotor 13, which is depicted only symbolically in FIG. 1 and is depicted in a schematic sectional view in FIGS. 2 and 3, has a rotor body 19, which is comprised of a lamination bundle or a solid iron bundle and which is supported on the rotor shaft 14 in a non-rotating fashion, and a number of permanent magnet poles 20 affixed to the outside of the rotor body 19. The rotor 13 shown in FIG. 2 is embodied as four-poled and consequently has four permanent magnet poles 20, which are disposed offset by 90° from one another on the circumference of the rotor body 19, wherein succeeding permanent magnet poles 20 have alternating polarities "N" and "S", as shown in FIG. 3. The rotor body 19 also accommodates a field excitation winding 21, which is connected to a pair of rotor slip rings 22, 23 that are mounted on the rotor shaft 14 in a non-rotating fashion. The field excitation winding 21 is comprised of a total of four coils 24, wherein each coil 24 is wound around one of the permanent magnet poles 20, i.e. the permanent magnet pole 20 is wound around all four of its side surfaces that extend in the axial direction and in the circumference direction. In the exemplary embodiment, the coils 24 are connected in parallel and the parallel circuit is connected to the rotor slip rings 22, 23. Alternatively, the coils 24 can also be connected in series. The coils 24 are wound so that the excitation current taken from the rotor slip rings 22, 23 produces an inverse magnetic field in succeeding coils 24.

The field excitation winding 21 is part of a device intended to produce a so-called fail-silent behavior of the direct-current drive, which assures that in the event of a malfunction in the direct-current drive, which can be caused by a defective power switch 17 or a winding short circuit in the stator winding 15 for example, the system cooperating with the direct-current drive is not disadvantageously influenced or impaired. In addition to the field excitation winding 21, this device also has a controller 25 integrated into the control unit 18, three instrument shunts 26 each disposed in a respective winding phase 151, 152, 153, and a temperature sensor 27 that detects the motor temperature. The instrument shunts 26 and the temperature sensor 27 are connected to inputs of the controller 25 via measuring lines 28. Two outputs of the controller 25 are connected to the rotor slip rings 22, 23 via control lines 29. Like the control unit 18, the controller 25 is attached to the connecting terminals 30, 31 of the direct-current drive and therefore to the DC voltage network. Directly after the connecting terminal 30, there is a circuit breaker 32, which can be triggered by the controller 25.

The controller 25 measures the amount and phase of the currents flowing through the instrument shunts 26 and adds these vectorially. When the direct-current drive is functioning properly, the result of this addition is always zero. If the vector sum deviates significantly from zero, then there is a malfunction in the winding phases 151–153 or in the power switches 17. In this case, the controller 25 triggers the circuit breaker 32 so that it opens and applies an excitation current to the field excitation winding 21, which current, by means of the coils 24, generates a magnetic flux oriented in the opposite direction from the magnetic flux of the permanent magnet poles 20. This weakens the excitation field of the synchronous motor 10 so that no voltage or only a low voltage is induced in the stator winding 15 and therefore no braking moment or only a slight braking moment occurs. The magnetic field is weakened as a function of the temperature of the synchronous motor 10, which is detected by the temperature sensor 27 and supplied to the controller 25. The temperature-dependent weakening of the magnetic field occurs in such a way that an irreversible demagnetization of the permanent magnet poles 20 is avoided and therefore permanent damage to the synchronous motor 10 is prevented. The magnitude of the excitation current applied to the rotor slip rings 22, 23 by the controller 25, which current can be adjusted by means of pulse-to-width modulation, is controlled as a function of the strand current in the stator winding 15, i.e. the excitation current is increased until the field weakening thus achieved induces only a low voltage and therefore only a low short-circuit current flows, which generates a still acceptable braking moment. If this reduction of the braking moment is insufficient, then the resulting excitation field can be brought to zero, but permanent damage to the permanent magnet poles 20 must then be accepted.

The device for producing a fail-silent behavior can advantageously also be used during normal operation of the direct-current drive. If the current direction in the field excitation winding 21 is selected so that the magnetic field generated by it is added to the magnetic field of the permanent magnet poles 20, then this results in a motor with a high power density. If the current direction in the field excitation winding 21 is reversed and therefore the resulting magnetic field is weakened, then higher speeds can be set. The magnitude of the field strengthening or field weakening is in turn set by the controller 25 by means of pulse-to-width modulation of the DC current supplied to the rotor slip rings 22, 23. The circuit breaker 32 is not triggered.

What is claimed is:
1. A brushless direct-current drive, comprising:
   a synchronous motor (10) having a stator (12) that supports a multi-phase stator winding (15) and a rotor (13) with permanent magnet poles (20), wherein the permanent magnet poles generate a magnetic flux that penetrates the stator winding (15);
   a switch unit (11), which precedes the stator winding (15) and is controlled by an electronic control unit (18), for commutating the stator winding (15), wherein the rotor (13) contains a field excitation winding (21);
   a circuit breaker (32), where said circuit breaker is connected between a common terminal (30) and the switch unit (11); and a controller (25), wherein said controller, in the event of a malfunction, triggers the circuit breaker (32) so that it opens, wherein said controller applies an excitation current to the field excitation winding (21) so that it generates a magnetic flux oriented in an opposite direction from the magnetic flux of the permanent magnet poles (20).

2. The direct-current drive according to claim 1, wherein the field excitation winding (21) has a number of coils (24) that corresponds to the number of permanent magnet poles (20), wherein each of the coils (24) is wound around one of the permanent magnet poles (20).

3. The direct-current drive according to claim 2, wherein the coils (24) are connected in parallel or in series and are connected to a pair of rotor slip rings (22, 23) that are connected to the rotor (13) in a non-rotating fashion.

4. The direct-current drive according to claim 3, wherein the rotor slip rings (22, 23) can be acted on with a direct current whose magnitude can be set by means of a controller (25).

5. The direct-current drive according to claim 4, wherein the controller (25) is integrated into the electronic control unit (18).

6. The direct-current drive according to claim 4, wherein the controller (25) has a pulse-to-width modulator.

7. The direct-current drive according to claim 4, wherein the controller (25) adjusts the DC voltage as a function of the motor temperature.

8. The direct-current drive according to claim 4, wherein the controller (25) adjusts the DC voltage as a function of a strand current flowing in the stator winding (15).

9. A brushless direct-current drive, comprising:
a synchronous motor (10) having a stator (12) that supports a multi-phase stator winding (15) and a rotor (13) with permanent magnet poles (20), wherein the permanent magnet poles generate a magnetic flux that penetrates the stator winding (15);
a switch unit (11), which precedes the stator winding (15) and is controlled by an electronic control unit (18), for commutating the stator winding (15), wherein the rotor (13) contains a field excitation winding (21), wherein the field excitation winding has a number of coils (24) that corresponds to the number of permanent magnet poles (20), wherein each of the coils (24) is wound around on eof the permanent magnet poles (20);
a circuit breaker (32), wherein said circuit breaker (32) is connected between a connection terminal (30) and the switch unit (11); and
a controller (25), wherein said controller, in the event of a malfunction, triggers the circuit breaker (32) so that it opens and wherein said controller applies an excitation current to the field excitation winding (21).

10. The direct-current drive according to claim 9, wherein the coils (24) are connected in parallel or in series and are connected to slip rings (22, 23).

11. The direct-current drive according to claim 9, wherein the coils (24) are connected so that the directions of the magnetic fluxes generated in coils (24) that succeed one another in a rotation direction are oriented in opposite directions.

12. The direct-current according to claim 11, wherein the rotor slip rings (22, 23) can be acted on with a DC voltage whose magnitude can be adjusted by means of controller (25).

13. The direct-current drive according to claim 11, wherein the rotor slip rings (22, 23) can be acted on with a DC voltage whose magnitude can be adjusted by means of a pulse-to-width modulation.

\* \* \* \* \*